(12) United States Patent
Malcolm (10) Patent No.: US 11,598,083 B2
(45) Date of Patent: Mar. 7, 2023

(54) ADJUSTABLE STIFFNESS CANTILEVERED SUPPORT

(71) Applicant: Roger J. Malcolm, San Clemente, CA (US)

(72) Inventor: Roger J. Malcolm, San Clemente, CA (US)

(*) Notice: Subject to any disclaimer, the term of this patent is extended or adjusted under 35 U.S.C. 154(b) by 178 days.

(21) Appl. No.: 17/166,703

(22) Filed: Feb. 3, 2021

(65) Prior Publication Data

US 2021/0156137 A1  May 27, 2021

Related U.S. Application Data

(63) Continuation-in-part of application No. 16/638,079, filed as application No. PCT/US2018/046088 on Aug. 9, 2018, now abandoned, which is a continuation-in-part of application No. 15/675,515, filed on Aug. 11, 2017, now Pat. No. 10,315,745.

(51) Int. Cl.
*E04B 1/28* (2006.01)
*F16M 13/02* (2006.01)
*B60G 11/02* (2006.01)
*B63H 9/065* (2020.01)

(52) U.S. Cl.
CPC ............. *E04B 1/28* (2013.01); *B60G 11/02* (2013.01); *F16M 13/02* (2013.01); *B60G 2202/11* (2013.01); *B60G 2206/428* (2013.01); *B60G 2206/7101* (2013.01); *B63H 9/065* (2020.02); *E04B 2103/04* (2013.01); *F16M 2200/065* (2013.01)

(58) Field of Classification Search
CPC ... F04B 1/00; F04B 1/28; B60G 11/00; B60G 11/02; B60G 2202/11; B60G 2206/428; B60G 2206/7101; B63H 9/065; F16M 13/00; F16M 13/02; F16M 2200/065; E04B 1/00; E04B 1/28
USPC ..................................................... 114/102.27
See application file for complete search history.

(56) References Cited

U.S. PATENT DOCUMENTS 3,905,321 A * 9/1975 Blythe, Jr. ............. B63H 9/065
114/102.27
5,549,947 A * 8/1996 Quigley ................ B29C 70/085
156/169
10,315,745 B2 * 6/2019 Malcolm ................ B63H 9/065

* cited by examiner

*Primary Examiner* — Lars A Olson
(74) *Attorney, Agent, or Firm* — Charmasson, Buchaca & Leach, LLP (57) ABSTRACT

An oblong cantilevered support includes a pair of latitudinally spaced apart oblong resilient members connected by a pair of longitudinally spaced apart blocks. The longitudinal spacing between the blocks can be adjusted. One or both of the members can have a tapered profile causing the stiffness of the member to vary along its length. Adjusting the spacing between the blocks and/or sliding a variable stiffness member longitudinally with respect to the blocks can adjust the stiffness of the overall support. Each member can be made from a unitary piece of fiber composite material such as a carbon fiber infused polymer wherein the orientations of the fibers are varied to provide both bending and torsional strength and stiffness that varies along the length of the member. The tapered geometry can be formed by a pair of parallely spaced apart oblique trapezoidal truncated pyramids interconnected by a webbing strip.

16 Claims, 8 Drawing Sheets

ADJUSTABLE STIFFNESS CANTILEVERED SUPPORT

PRIOR APPLICATION

This is a continuation-in part of U.S. patent application Ser. No. 16/638,079, filed 2020 Feb. 10, which is a 371 of International Patent Application No. PCT/US2018/046088, filed 2018 Aug. 9, which is a continuation of U.S. patent application Ser. No. 15/675,515, Filed 2017 Aug. 11 now U.S. patent Ser. No. 10/315,745, issued 2019 Jun. 11 all of which are incorporated herein by reference.

FIELD OF THE INVENTION

This invention relates to resilient structural members such as beams, springs and cantilevered supports having adjustable stiffness.

BACKGROUND

Composite materials such as carbon fiber reinforced polymers have long been used to create structural elements due to their low weight and high stiffness/strength to bending moments along the oblong fibers' orientation.

U.S. patent Ser. No. 10/315,745, Malcolm, incorporated herein by reference, describes using a fiber reinforced composite material to make a sail batten. The cross-sectional geometry of the batten changes from the proximal end of the batten located near the mast to the opposite distal end near the trailing edge of the sail in order to vary the stiffness of the batten along its longitudinal length and to accommodate intermittent torsional loads.

One problem with such prior structural support members is that their stiffness is not adjustable. In situations such as vehicular leaf spring support of axles for example, adjusting resiliency parameters has been the realm of adjustable shock absorbers and other devices. However, such devices do not provide superior performance when there are large variations in static loads and wide ranges dynamic loads, and that provide torsional flexibility.

Therefore, there is a need for an apparatus which addresses one or more of the above identified inadequacies.

SUMMARY

The principal and secondary objects of the invention are to provide an improved structural member. These and other objects can be achieved by a beam including a pair of spaced apart oblong members connected by a pair of spaced apart blocks and where at least one of the members has variable longitudinal stiffness.

In some embodiments the variable stiffness member can be slid longitudinally to adjust the overall stiffness of the beam.

In some embodiments at least one of the members comprises a tapered profile that allows for a larger range of longitudinal stiffness adjustment depending on the positioning of the tapered member, and an larger degree of torsional flexibility near the narrow end of the member.

In some embodiments one or more of the members can be made from a fiber reinforced material having plural fiber orientations selected to adjust longitudinal stiffness different from latitudinal stiffness.

In some embodiments the member can be made from fiber composite materials such as carbon fiber embedded epoxy resin wherein the orientations of the fibers are varied to provide both bending and torsional strength and stiffness that varies along the length of the member.

In some embodiments there is provided an adjustable stiffness support device comprises: a first resilient member having a first oblong shape in a longitudinal direction; said first member having a near end and a far end; a second resilient member having an second oblong shape in said longitudinal direction; said second member having a proximal end and a distal end; wherein said first and second members are spaced apart from each other by a separation distance; a first block connecting said first member to said second member; a second block connecting said first member to said second member; wherein said first and second blocks are longitudinally spaced apart by a spacing; wherein said second member has a stiffness that is longitudinally variable.

In some embodiments said second member tapers between said proximal end and said distal end.

In some embodiments said second member slides between a first longitudinal position and a second longitudinal position spaced a longitudinal length apart from said first longitudinal position.

In some embodiments said first block comprises a first fastener releasably securing said first block to said second member; and wherein said second block comprises a second fastener releasably securing said second block to said second member.

In some embodiments at least one of said first and second blocks comprises a third fastener releasably securing said at least one of said first and second blocks to said first member.

In some embodiments said first block has a first longitudinal position with respect to said members and wherein said second block has a second longitudinal position with respect to said members, and wherein said first and second longitudinal positions are adjustable.

In some embodiments said first member has a fixed proximal end and a free distal end, whereby a load applied at said second block is cantileveredly supported by said device.

In some embodiments said separation distance is adjustable.

In some embodiments said spacing is adjustable.

In some embodiments said first block is fixed with respect to said members and wherein said a longitudinal position of said second block is adjustable.

In some embodiments said second member comprises: a first zone between said proximal end and said distal end; wherein said first zone comprises a first fiber reinforced material having a first set of plural fiber orientations; wherein first fiber reinforced material has a first longitudinal stiffness and a first latitudinal stiffness different from said first longitudinal stiffness; a second zone between said proximal end and said distal end, and adjacent to said first zone; wherein said second zone comprises a second fiber reinforced material having a second set of plural fiber orientations different from said first set of plural fiber orientations; wherein said second fiber reinforced material has a second longitudinal stiffness different from said first longitudinal stiffness.

In some embodiments said first set of plural fiber orientations comprises a first fiber layer orientation rotated a first non-zero angle with respect to a second fiber layer orientation.

In some embodiments said first set of plural fiber orientations further comprises a third fiber layer orientation rotated a second non-zero angle with respect to said second fiber layer orientation, and wherein said second non-zero angle is different from said first non-zero angle.

In some embodiments said second set of plural fiber orientations comprises a fourth fiber layer orientation rotated a third non-zero angle with respect to a second fiber layer orientation.

In some embodiments said first non-zero angle is at least 90 degrees, said second non-zero angle is at least 45 degrees, and said third non-zero angle is at least 30 degrees.

In some embodiments said first set of plural fiber orientations and said second set of plural fiber orientations have a least one fiber layer in common.

In some embodiments said second member further comprises:
a pair of substantially parallel, oblong, spaced-apart rods, laterally joined by a webbing strip; and, wherein each of said pair of rods gradually tapers from said proximal end toward said distal end.

In some embodiments a first one of said pair of rods comprises an axial lumen.

In some embodiments said device further comprises a cable extending through said axial lumen; said cable being connected to said distal end abd said proximal end; and a mechanism for adjusting the tension of said cable.

In some embodiments said first one of said rods has a substantially conical shape; and further comprises an axial hollow having a substantially conical shape.

In some embodiments said second member has a variable cross-sectional geometry along a longitudinal length of said second member.

In some embodiments said second member further comprises: said second member having a first cross-sectional area near said proximal end and a second cross-sectional area near said distal end; wherein said first cross-sectional area is larger than said second cross-sectional area.

In some embodiments said first cross-sectional area is substantially barbell shaped.

In some embodiments said first cross-sectional area comprises a pair of spaced apart, interconnected, diametrically symmetric geometric shapes selected from the group consisting of: circles, ellipses, triangles, squares, rectangles, trapezoids, pentagons, hexagons, heptagons, octagons, nonagons, and decagons.

In some embodiments said second member is formed by a unitary piece of composite material.

In some embodiments both of said pair of rods are similarly shaped and dimensioned.

In some embodiments said first cross-sectional area has a width dimension corresponding to said webbing strip, and a height dimension corresponding to an outer diameter of said one of said rods, and wherein said width dimension is equal to or greater than said diameter dimension.

In some embodiments said second member further comprises: said second member having a first width dimension at said proximal end and a second width dimension at said distal end; and, wherein said first width dimension is equal to or greater than said second width dimension.

In some embodiments there is provided the combination of a vehicle having a leaf spring including a plurality of spaced apart flexible members, wherein at least one of said members comprises a fiber reinforced composite structural body having a first set of plural fiber orientations.

In some embodiments there is provided an improved variable stiffness structural beam comprises a pair of spaced apart members wherein at least one of said pair of spaced apart members comprises a fiber reinforced material having plural fiber orientations selected to adjust a longitudinal stiffness of said at least one of said pair of spaced apart members. In some embodiments there is provided a pair of substantially parallel, spaced-apart tapering rods laterally joined by a substantially planar webbing strip.

In some embodiments there is provided improved variable stiffness structural member comprises: said member having an oblong shape in a longitudinal direction; said member having a proximal end and a distal end; a first zone between said proximal end and said distal end; wherein said first zone comprises a first fiber reinforced material having a first set of plural fiber orientations; wherein first fiber reinforced material has a first longitudinal stiffness and a first latitudinal stiffness different from said first longitudinal stiffness.

In some embodiments said member further comprises: a second zone between said proximal end and said distal end; wherein said second zone comprises a second fiber reinforced material having a second set of plural fiber orientations different from said first set of plural fiber orientations; wherein said second fiber reinforced material has a second longitudinal stiffness different from said first longitudinal stiffness.

In some embodiments said first one of said rods has a substantially conical shape; and wherein said axial hollow has a substantially conical shape.

In some embodiments said rods have a substantially oblique circular conical shape.

In some embodiments both of said pair of rods are similarly shaped and dimensioned.

In some embodiments said first cross-sectional area has a width dimension corresponding to said webbing strip, and a height dimension corresponding to an outer diameter of said one of said rods, and wherein said width dimension is equal to or greater than said diameter dimension.

In some embodiments there is provided an improved variable stiffness structural member comprises a fiber reinforced material having plural fiber orientations selected to adjust a longitudinal stiffness different from a latitudinal stiffness.

In some embodiments there is provided an improved variable stiffness structural member comprises: a pair of substantially parallel, oblong, spaced-apart rods, laterally joined by a webbing strip; wherein each of said rods has a variable cross-sectional geometry along a length of said member.

In some embodiments said member further comprises: a proximal end and a distal end; said member having a first cross-sectional area near said proximal end and a second cross-sectional area near said distal end; wherein said first cross-sectional area is larger than said second cross-sectional area.

In some embodiments each of said pair of rods gradually tapers from said proximal end toward said distal end.

In some embodiments said first one of said pair of rods comprises an axial hollow.

In some embodiments said axial hollow has a substantially conical shape.

In some embodiments said rods have a substantially conical shape.

In some embodiments said rods have a substantially oblique circular conical shape.

In some embodiments both of said pair of rods are similarly shaped and dimensioned.

In some embodiments said first cross-sectional area is substantially barbell shaped.

In some embodiments said first cross-sectional area comprises a pair of spaced apart, interconnected, diametrically symmetric geometric shapes.

In some embodiments said shapes are selected from the group consisting of: circles, ellipses, triangles, squares, rectangles, trapezoids, pentagons, hexagons, heptagons, octagons, nonagons, and decagons.

In some embodiments said first cross-sectional area has a width dimension corresponding to said webbing strip, and a height dimension corresponding to an outer diameter of said one of said rods, and wherein said width dimension is equal to or greater than said diameter dimension.

In some embodiments said member further comprises having a first width dimension at said proximal end and a second width dimension at said distal end.

In some embodiments said first width dimension is equal to or greater than said second width dimension.

In some embodiments said member is formed by a unitary piece of composite material.

In some embodiments said member further comprises fiber reinforced material having a first fiber orientation and a second fiber orientation.

In some embodiments said first orientation is rotated substantially 90 degrees with respect to said second fiber orientation.

In some embodiments said member further comprises fiber reinforced material having a third fiber orientation rotated substantially 45 degrees with respect to said second fiber orientation.

In some embodiments said member further comprises: a plural number of discrete zones wherein a first of said zones includes a first set of plural fiber orientations, and a second of said zones includes a second set of plural fiber orientations different from said first set of plural fiber orientations.

In some embodiments there is provided the combination of a sailing craft having a sail and a plurality of sail battens, wherein at least one of said battens comprises: a fiber reinforced composite structural member which comprises: a pair of substantially parallel, spaced-apart tapering rods, laterally joined by a webbing strip.

The original text of the original claims is incorporated herein by reference as describing features in some embodiments.

DESCRIPTION OF THE EXEMPLARY EMBODIMENTS

Figure 1:
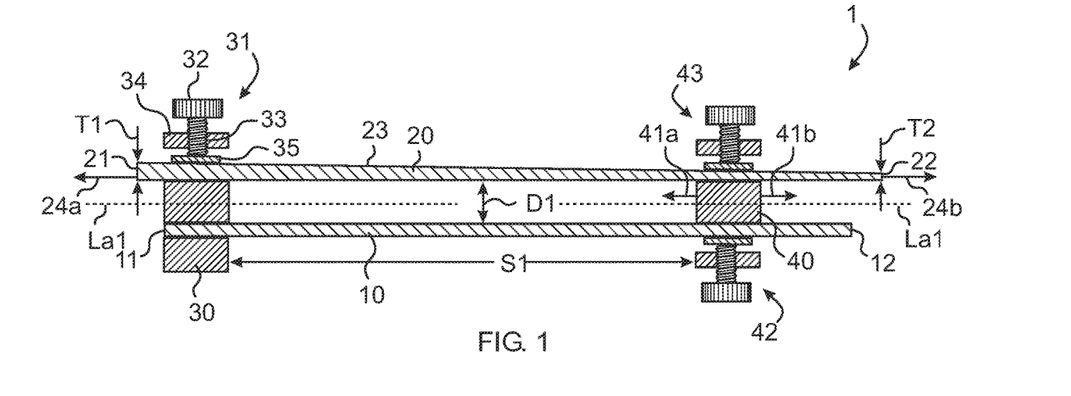
FIG. 1 is a diagrammatic cross-sectional side view of an adjustable variable stiffness beam according to an exemplary embodiment of the invention.

In this specification, the references to top, bottom, upward, downward, upper, lower, vertical, horizontal, sideways, lateral, back, front, proximal, distal, near, far, etc. can be used to provide a clear frame of reference for the various structures with respect to other structures while the support structure is in its horizontal orientation as shown in FIG. 1, and not treated as absolutes when the frame of reference is changed, such as when the device is oriented upright, or at an angle.

The term "substantially" can be used in this specification because manufacturing imprecision and inaccuracies can lead to non-symmetricity and other inexactitudes in the physical characteristics, shape, dimensioning and orientation of various structures. Further, use of "substantially" in connection with certain geometrical shapes, such as "quadrangular", "cylindrical", "conical", and "circular", physical characteristics, such as "transparent", and orientations, such as "axial", "parallel" and "perpendicular", can be given as a guide to generally describe the function of various structures, and to allow for slight departures from exact mathematical geometrical shapes, physical characteristics, and orientations, while providing adequately similar function. Those skilled in the art will readily appreciate the degree to which a departure can be made from the mathematically exact geometrical references or descriptions. Those skilled in the art will readily appreciate which features of individual embodiments can be applicable and incorporated into the features of other embodiments.

Figure 2:
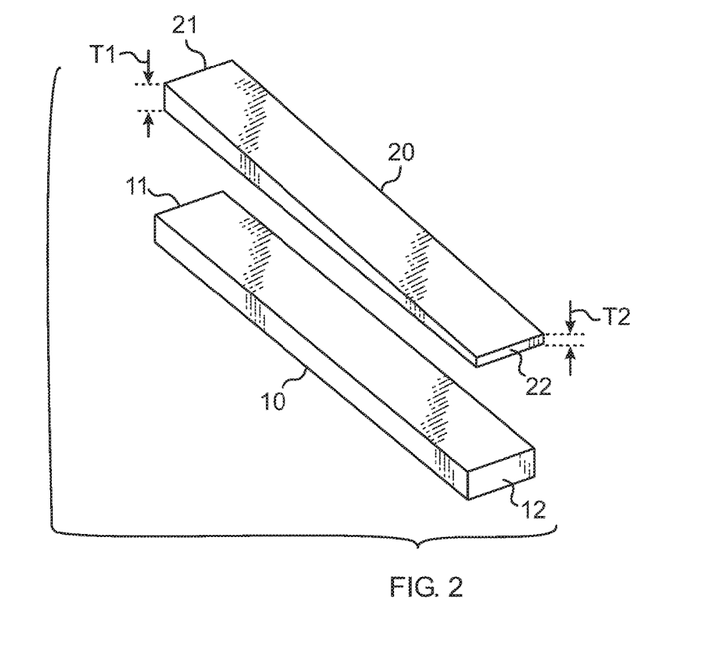
FIG. 2 is a diagrammatic perspective view of the pair of spaced apart members of the beam of FIG. 1.

Referring now to the drawing, there is shown in FIGS. 1-2 the various components of a resilient structural support device in the form of a stiffness adjustable oblong beam 1 extending along a longitudinal axis La1 according to an exemplary embodiment of the invention. The beam can include a first rigid, but resiliently flexible oblong member 10 and a second rigid, but resiliently flexible oblong member 20 substantially parallelly spaced apart from each other by a distance D1 perpendicular to the longitudinal axis, thus latitudinally spacing the members apart. In this way, in this embodiment, the members may not directly contact nor substantially diverge from one another. In other words they can be arranged in such a way that there is an absence of direct contact between the two members. The members can be made from a rigid, but resiliently flexible material such as steel, aluminum, plastic, or a fiber-infused composite material such as fiberglass or carbon fiber composite material. Those skilled in the art of mechanics will appreciate that the components or the members shown in the drawing may be oversized or undersized in order to enhance clarity.

The first rigid, but resiliently flexible oblong member 10 can have a substantially quadrangular oblong shape having largest dimension in the longitudinal direction terminating at a near end 11 and a far end 12. The first member can have a substantially uniform width, substantially uniform thickness, and more importantly substantially uniform stiffness along its entire longitudinal length. Alternately, the first member can have a variable stiffness along its longitudinal length. In this embodiment the first member can be referred to as the uniform stiffness member 10.

The second rigid, but resiliently flexible oblong member 20 can have a substantially quadrangular oblong shape having largest dimension in the longitudinal direction terminating at a near end 21 and a far end 22. The second member can have a substantially uniform width, and a variable stiffness along its longitudinal length as will be described below. In this embodiment the second member can be referred to as the variable stiffness member 20.

In this embodiment the second resiliently flexible oblong member 20 can achieve its variable stiffness by having a cross-sectional geometry that changes along its longitudinal length. Specifically, the member can taper in thickness from its proximal end 21 where the thickness T1 is larger, to its distal end 22 where the thickness T2 is smaller. In this way the more distal part of the member is more flexible than the proximal part, and the member has a variable cross-sectional geometry along the longitudinal length of the member.

The members 10,20 can be held in their spaced apart configuration by a pair of blocks 30,40 separated by a longitudinal spacing S1. In this embodiment that spacing can be adjustable because the longitudinal position of one of the blocks 40 can be adjusted as indicated by arrows 41a,41b. The movable block 40 can be releasably locked in its longitudinal position by a pair of fasteners 42,43 which can releasably secure the block to the uniform stiffness member 10 and the variable stiffness member 20 respectively. In this embodiment, the other of the blocks 30 can be fixedly secured to the uniform stiffness member 10 and releasably secured to the variable stiffness member 20 by its own fastener 31.

Each fastener (31 for example) can be in the form of a locking thumbscrew 32 which can rotatively engage a threaded hole 33 in the upper portion 34 of the block 31. The tip of the thumbscrew can be rotatively secured to a pressure plate 35 which can pinch against the outer surface 23 of the member when the thumbscrew is tightened in is locking position.

In this embodiment, since both blocks 30,40 can be releasably secured to the variable stiffness member 20, the variable stiffness member can slide longitudinally as shown by the arrows 24a,24b when the appropriate fasteners are unlocked. In this way the longitudinal position of the variable stiffness member between the blocks can be adjusted, thereby adjusting the overall stiffness of the beam 1.

Figure 3:
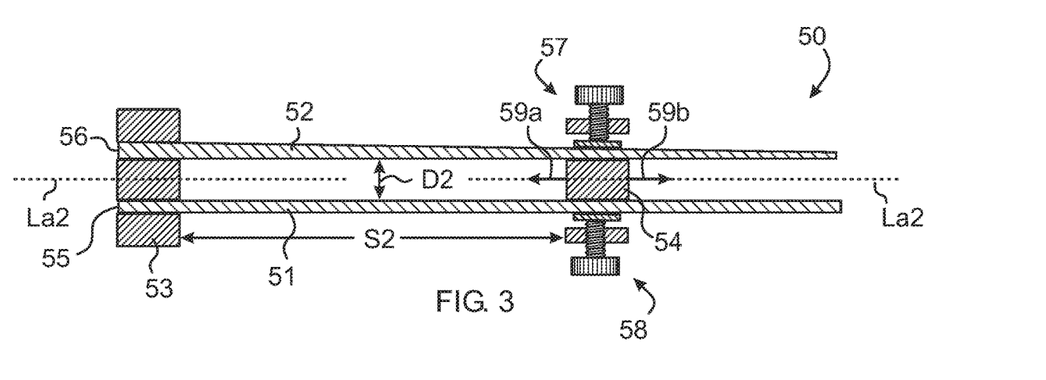
FIG. 3 is a diagrammatic cross-sectional side view of an adjustable variable stiffness beam according to an alternate exemplary embodiment of the invention having a fixed block.

FIG. 3 shows an alternate embodiment of a resilient structural support device in the form of an oblong stiffness adjustable beam 50 extending along a longitudinal axis La2. The beam is similar to the previous embodiment, in that it includes a first rigid, but resiliently flexible oblong member 51 having substantially uniform stiffness and a second rigid, but resiliently flexible oblong member 52 having a variable stiffness along its longitudinal length. The two members can be substantially parallely spaced apart from each other by a distance D2 perpendicular to the longitudinal axis, and can be held in their spaced apart configuration by a pair of blocks 53,54 separated by a longitudinal spacing S2. In this embodiment however, the first block 53 can be fixedly attached to both members at their proximal and near ends 55,56 while the second block 54 can have a pair of fasteners 57,58 which allow it to be releasably locked to the members and slide longitudinally as indicated by arrows 59a,59b when unlocked in order to adjust the spacing between the blocks and thereby adjust the stiffness of the beam.

Figure 4:
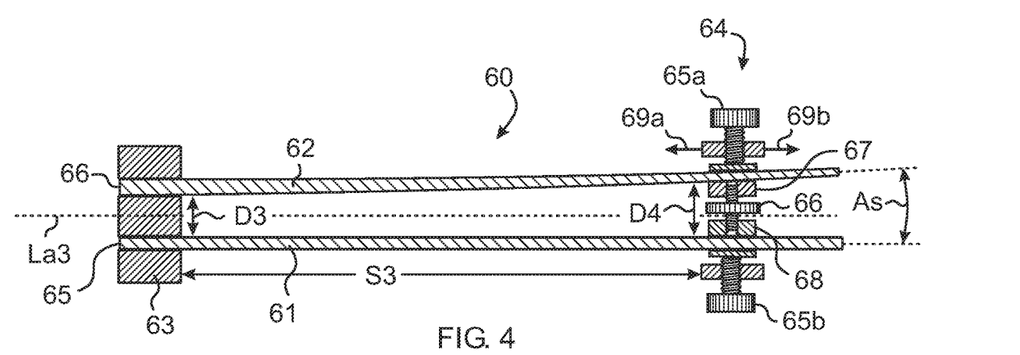
FIG. 4 is a diagrammatic cross-sectional side view of an adjustable variable stiffness beam according to an alternate exemplary embodiment of the invention having a separation distance adjustable block.

FIG. 4 shows an alternate embodiment of a resilient structural support device in the form of an oblong stiffness adjustable beam 60 extending along a longitudinal axis La3. The beam is similar to the previous embodiment, in that it includes a first rigid, but resiliently flexible oblong member 61 having substantially uniform stiffness and a second rigid, but resiliently flexible oblong member 62 having a variable stiffness along its longitudinal length. The two members can be spaced apart from each other by a pair of blocks 63,64 separated by a longitudinal spacing S2. The first block 63 can be fixedly attached to both members near one end while the second block 64 can have a pair of fasteners 65a,65b which allow it to be releasably locked to the members and slide longitudinally as indicated by arrows 69a,69b when unlocked in order to adjust the spacing between the blocks and thereby adjust the stiffness of the beam. In this embodiment however, the first block 63 can provide a member separation distance D3, perpendicular to the longitudinal axis, that is fixed. However, the second block 64 can provide a member separation distance D4, perpendicular to the longitudinal axis, that is adjustable. The separation distance D4 can be adjusted by a distance adjustment mechanism such as a rotating a turnbuckle-type wheel 66 that has a pair of alternately threaded coaxial posts that engage threaded bores in a pair of platforms 67,68, that bear against the inwardly facing surfaces of the members. In this way, the members can be arranged in a non-parallel manner so that an angle As can be formed between the members. The angle can be adjusted thereby further adjusting the stiffness of the beam. It shall be understood that both blocks can be adapted to include a distance adjustment mechanism in order to provide further adjustability to the stiffness of the beam.

Figure 5:
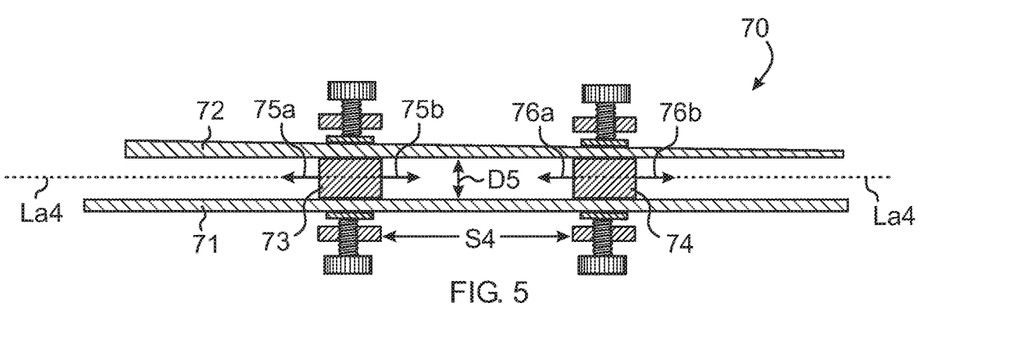
FIG. 5 is a diagrammatic cross-sectional side view of an adjustable variable stiffness beam according to an alternate exemplary embodiment of the invention having two moveable blocks.

FIG. 5 shows an alternate embodiment of a resilient structural support device in the form of an oblong stiffness adjustable beam 70 extending along a longitudinal axis La4. The beam can be similar to the previous embodiment, in that it can include a first rigid, but resiliently flexible oblong member 71 having substantially uniform stiffness and a second rigid, but resiliently flexible oblong member 72 having a variable stiffness along its longitudinal length. The two members can be substantially parallely spaced apart from each other by a distance D5 perpendicular to the longitudinal axis, and held in their spaced apart configuration by a pair of blocks 73,74 that are separated by a longitudinal spacing S4. In this embodiment however, both blocks can be fitted with dual fasteners which allow each block to be releasably locked to one or both of the members and allow each block to slide longitudinally as indicated by arrows 75a,75b and 76a,76b when unlocked in order to adjust the spacing between the blocks and thereby adjust the stiffness of the beam. Clearly in this way both members can slide longitudinally with respect to the blocks when the fasteners are unlocked.

Figures 6, 7:
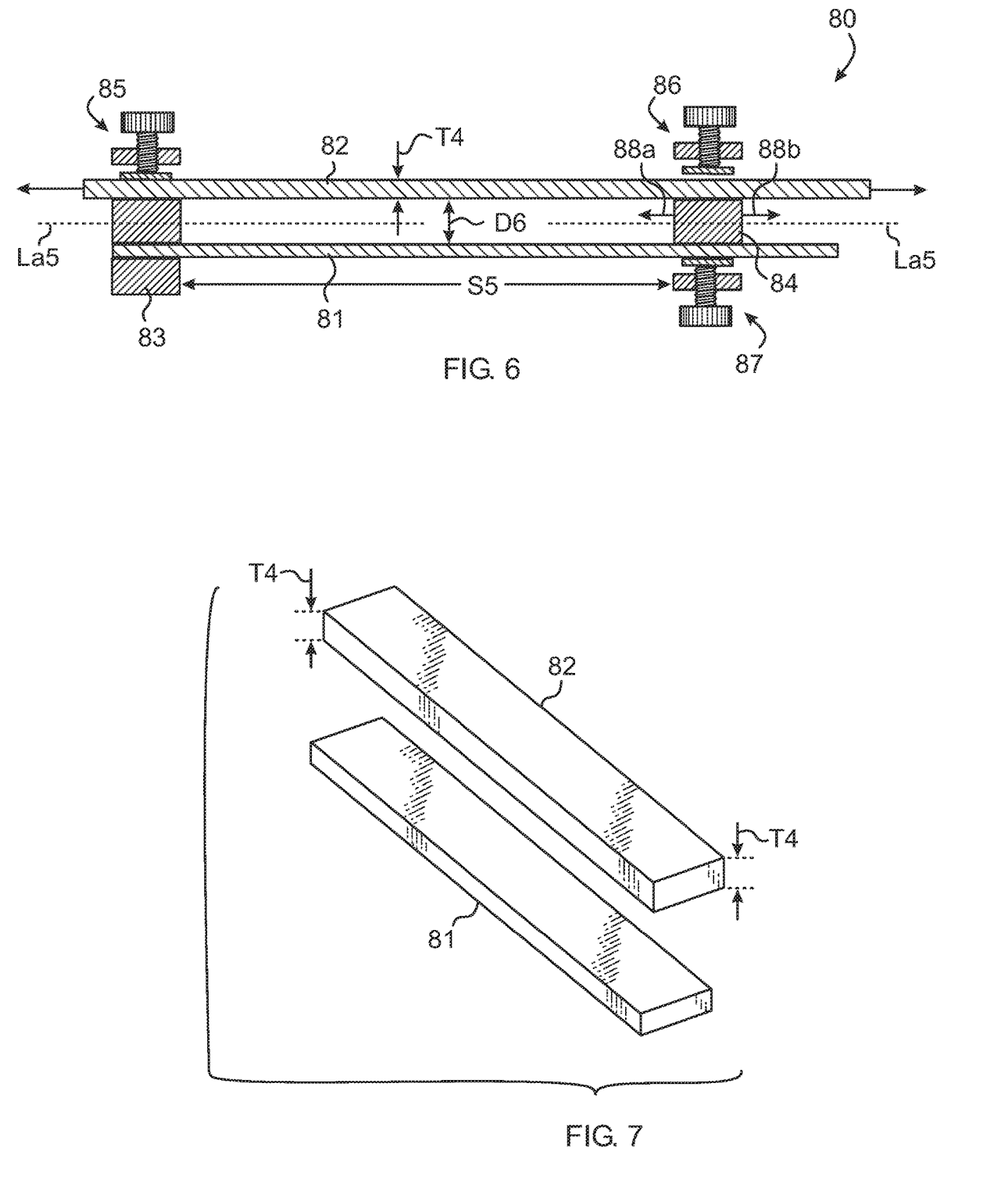
FIG. 6 is a diagrammatic cross-sectional side view of an adjustable variable stiffness beam according to an alternate exemplary embodiment of the invention having a moveable block and a moveable member.
FIG. 7 is a diagrammatic perspective view of the pair of spaced apart members of the beam of FIG. 6.

FIGS. 6 and 7 show an alternate embodiment of a resilient structural support device in the form of an oblong stiffness adjustable beam 80 extending along a longitudinal axis La5. The beam is similar to the embodiment FIG. 1, in that it can include a first rigid, but resiliently flexible oblong member 81 having substantially uniform stiffness and a second rigid, but resiliently flexible oblong member 82 having a variable stiffness along its longitudinal length. The two members can be substantially parallely spaced apart from each other by a distance D6 perpendicular to the longitudinal axis, and held in their spaced apart configuration by a pair of blocks 83,84 separated by a longitudinal spacing S4. The first block 83 can be fixedly attached to the first member 81 and releasably locked to the second member 82 using a fastener 85. The second block 84 can include a pair of fasteners 86,87 allowing it to be releasably locked to both of the members and slide longitudinally as indicated by arrows 88a,88b when unlocked in order to adjust the spacing between the blocks.

In this embodiment however, the second member 82 can have a substantially uniform width and thickness T4 along its longitudinal length but also exhibit variable stiffness by having longitudinal zones that have different fiber orientations as detailed below. Alternately, both the first member and second member can have a variable stiffness along their longitudinal length. In some circumstances, with both members having variable stiffness the variability of the stiffness of the beam can be made greater.

The stiffness properties of the variable stiffness member can be adjusted by forming the member from fiber-resin composite materials such as a carbon-fiber epoxy resin composite. The uncured epoxy is combined with carbon fibers using techniques well known in the art. In this example a thermosetting preimpregnated resin tape or "prepreg" is used such as unidirectional fiber tape available from American Cyanamid Co. of Wayne, N.J. Layers of the tape are successively wrapped onto one another to form into an uncured member body corresponding to the desired size of the member. Once cured the body becomes the unitary fiber composite member.

Figure 8:
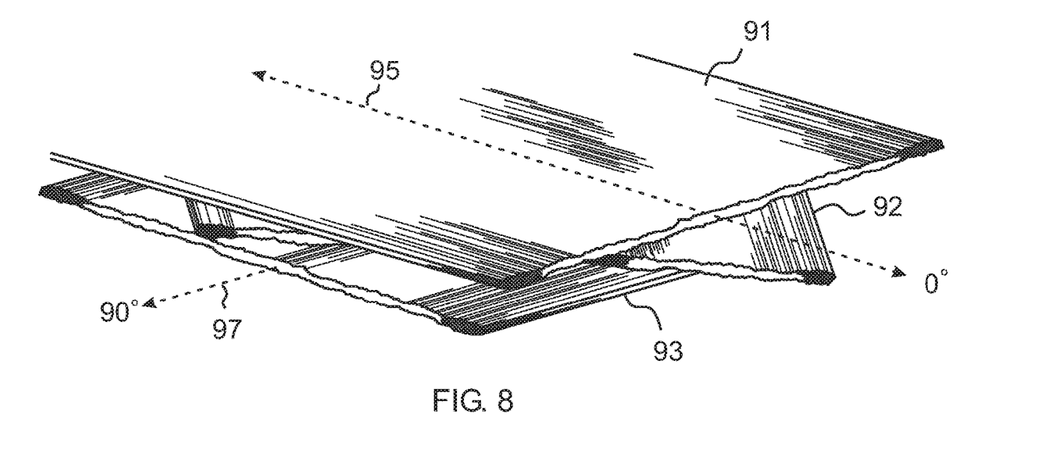
FIG. 8 is a diagrammatic partial perspective view of fiber composite layers having differential orientations.
Figure 9:
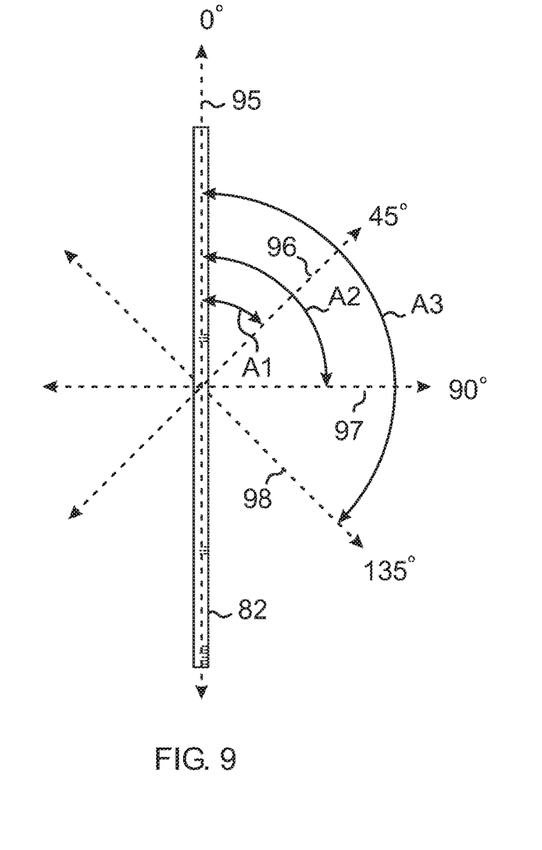
FIG. 9 is a diagrammatic front view of a fiber composite member showing the variously selected fiber orientations.

As shown diagrammatically in FIGS. 8 and 9, successive layers 91,92,93 of tape can be applied where the orientation or direction of fibers in each layer are different from the direction of fibers in each successive layer to adjust stiffness properties to forces applied from various directions and magnitudes over time. For example, a first layer 91, can be oriented at 0 degrees so that the elongation direction of the embedded fibers are parallel with the elongation axis 95 of the member 82. A second layer 92, can be oriented so that the elongation direction 96 of the embedded fibers are at an angle A1 of about 45 degrees with respect to the elongation axis of the member. Similarly, a third layer 93, can be oriented so that the elongation direction 97 of the embedded fibers are at an angle A2 of about 90 degrees with respect to the elongation axis of the member. A fourth layer, can be oriented so that the elongation direction 98 of the embedded fibers are at an angle A3 of about 135 degrees with respect to the elongation axis of the member. In this way, the fiber reinforce material forming the member can have a set of fiber orientations where a first layer is rotated a first non-zero angle with respect to a second layer, and a third layer rotated a second non-zero angle with respect to the first layer, and so on. It has been found that a variable stiffness member can be made having the first angle A1 being at least 15 degrees, the second angle A2 being at least 30 degrees, and the third angle A3 being at least 45 degrees. Successive layers can have even greater angles as shown below.

Figure 10:
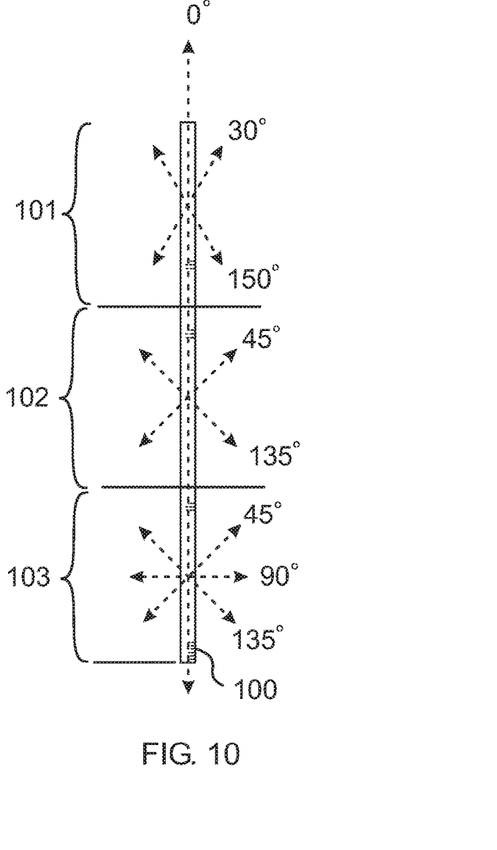
FIG. 10 is a diagrammatic front view of a fiber composite member showing plural zones of variously selected fiber orientations.
Figure 11:
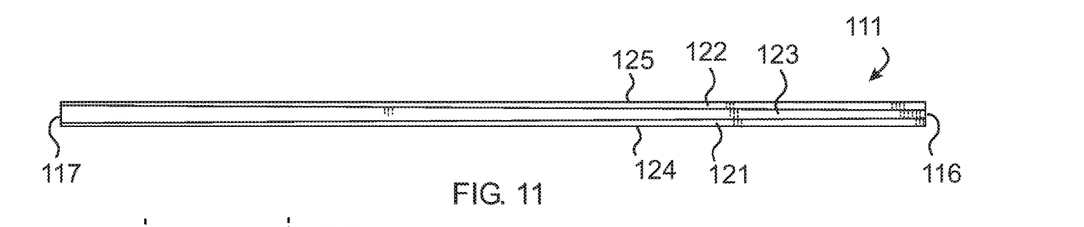
FIG. 11 is a diagrammatic front view of a complex geometry variable stiffness structural member according to an alternate exemplary embodiment of the invention having quadrangular cross-section rods.
Figures 12, 13:
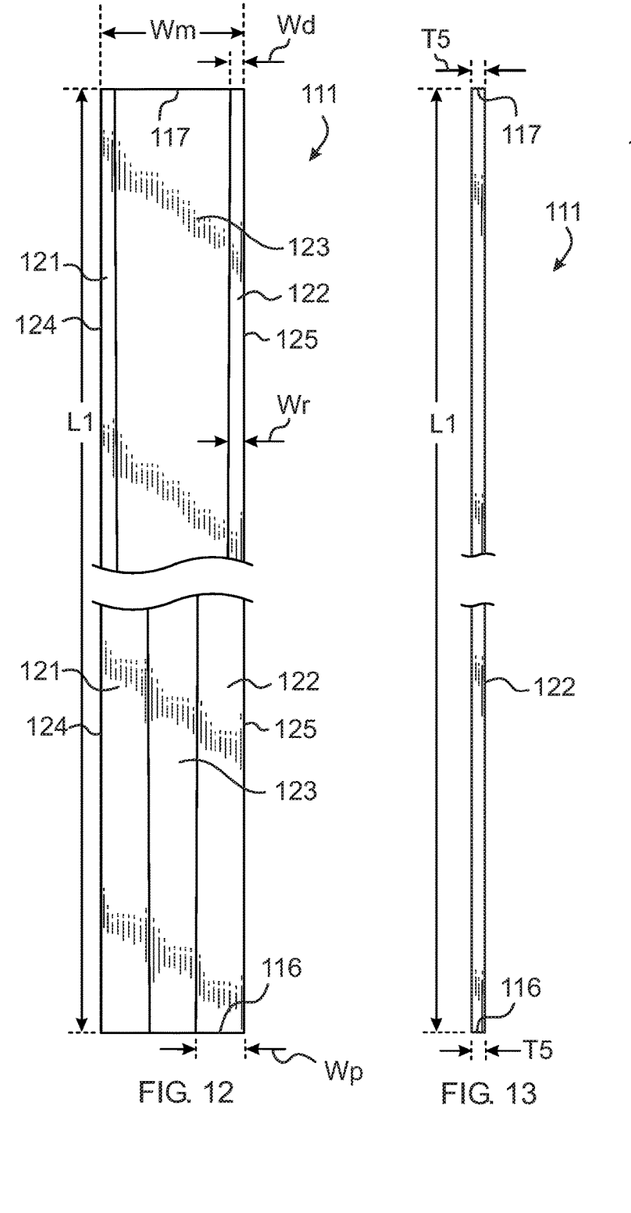
FIG. 12 is a diagrammatic partial elevational front view thereof.
FIG. 13 is a diagrammatic partial elevational side view thereof.
Figure 14:
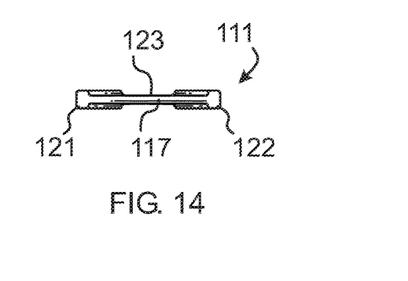
FIG. 14 is a diagrammatic distal end view thereof.
Figure 15:
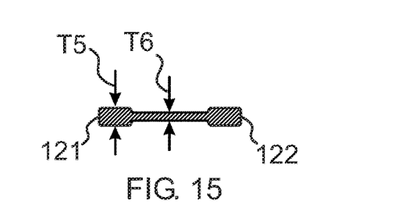
FIG. 15 is a diagrammatic cross-sectional end view taken along a medial section thereof.

Referring now to FIG. 10, the variable stiffness structural member 100 can be divided into a plural number of zones where the fiber orientation of the various layers within each zone can be different from the orientations on other zones in order to selectively and preferentially rigidize the different zones of the member differently. In other words, each zone can have a fiber reinforced material having a set plural fiber orientations that are the same or different from the set of fiber orientations of the material in another zone.

By way of example, the member 100 can be divided along its longitudinal dimension into three discrete latitudinal zones 101,102,103 where the first distal zone 101 can have a set of fiber layers oriented in the 0 degree direction and in the 30 degree and 150 degree directions. A second medial zone 102 can have a set of fiber layers oriented in the 0 degree direction and in the 45 degree and 135 degree directions. A third proximal zone 103 can have a set of fiber layers oriented in the 0 degree direction and in the 45 degree, 90 degree, and 135 degree directions. Thus, the set of fiber layers in a particular zone results in that set having a plural number of different fiber orientations.

Further, plural fiber orientations of one set can be different from the plural fiber orientations of another set. These differential fiber orientation sets combined over the length of the member can preferentially rigidize the proximal zone to greater bending and torsional loads than the distal zone. Of course adjacent zones can share a layer having a particular orientation. For example, a single layer can have the 0 degree orientation and extend across all three zones as shown. In addition layers from one zone can, and in practice often do partially overlap into an adjacent zone. It has been found that a variable stiffness member can be made of latitudinally separated zones, each having a set of fiber orientations which include different layers being rotated at least 15 degrees with respect to one another. In the above example a first zone 103 can have a first set of fiber orientations where some layers are rotated at least 90 degrees with respect to one another, and others are rotated at least 45 degrees with respect to one another, and another zone 101 sharing the 0 degree layer and having a second set of fiber orientations where some layers are rotated at least 30 degrees with respect to one another.

Alternately, one or both of the members of the beam can have a more complex geometry which provides further variability of stiffness along the longitudinal length of the member.

Referring now to FIGS. 11-16, there is shown a more complex geometry, variable stiffness member 111 which can be used in an adjustable stiffness cantilevered support beam such as those described above. The member can include a pair of parallelly spaced apart, solid rods 121,122 forming the opposite lateral edges 124,125 of the member and extending along substantially the entire longitudinal length L1 of the member from the proximal end 116 to the distal end 117. Each of the rods can have a substantially tapered truncated pyramidal shape having a substantially quadrangular cross-section where its thickness T5 remains substantially uniform while its width Wr varies according to its longitudinal position on the member, gently and gradually tapering from a wider proximal width Wp to a narrower distal width Wd. The substantially tapered quadrangular shape can be characterized by a ratio between these two widths Wd/Wp which can range from between about 0.05 to 0.5. The tapered truncated pyramidal shape can be oblique so that the width Wm of the member remains substantially constant along its entire longitudinal length, and the cross-sections of each rod perpendicular to the elongation axis of the member can have a substantially rectangular shape.

The rods 121,122 are interconnected by a medial webbing strip 123 having generally parallel trapezoidal front and back surfaces. Thus, the webbing strip can be substantially planar, having a substantially uniform thickness T6 along the entire longitudinal length of the member. In this way, the fasteners can engage the webbing without needing to accommodate a large range of thicknesses.

Figure 16:
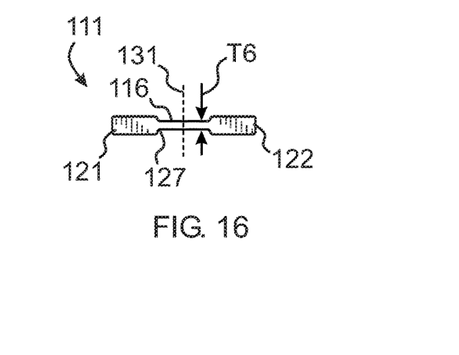
FIG. 16 is a diagrammatic proximal end view thereof.
Figure 17:
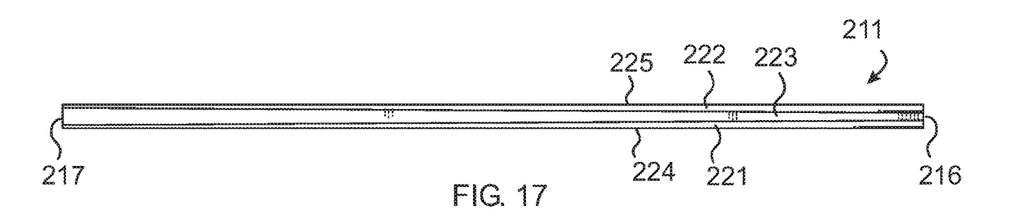
FIG. 17 is a diagrammatic front view of a complex geometry variable stiffness structural member according to an alternate exemplary embodiment of the invention having circular cross-section rods.
Figure 18:
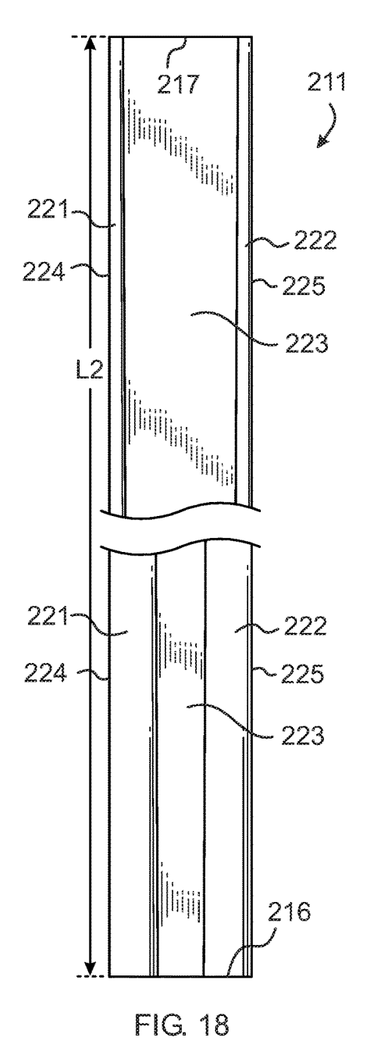
FIG. 18 is a diagrammatic partial elevational front view thereof.
Figure 19:
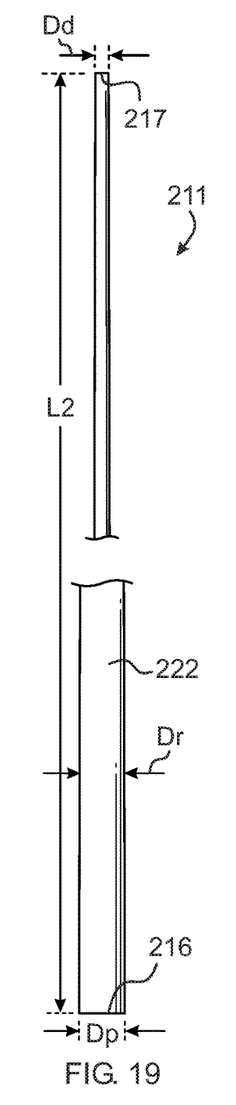
FIG. 19 is a diagrammatic partial elevational side view thereof.
Figure 20:
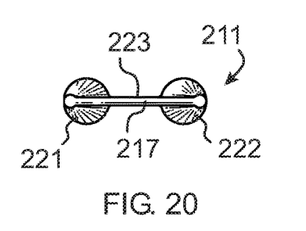
FIG. 20 is a diagrammatic distal end view thereof.
Figure 21:
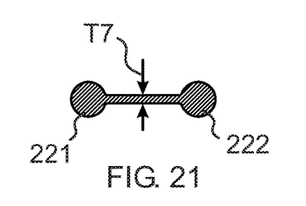
FIG. 21 is a diagrammatic cross-sectional end view taken along a medial section thereof.

Referring primarily to FIG. 16, by making both rods 121,122 substantially identically shaped and dimensioned, the member 111 can be made to be symmetric about a plane 131 perpendicularly bisecting the webbing strip 123. In this way, the symmetrical member can provide substantially uniform resistance to various loads. It shall be noted that the transition between each rod and webbing strip can be gradual in the form of a concave fillet 127. Although the member is shown having a substantially barbell shaped cross-section where the rods form a pair of rectangles, other shapes are available, such as for example, circles, ellipses, ovals, or other polygons having rounded vertices.

Referring now to FIGS. 17-22, there is shown a variable stiffness member 211 which can be used in an adjustable stiffness cantilevered support beam such as those described above. The member can be similar to the member of FIGS. 11-16, however, in this embodiment the substantially parallelly spaced apart, solid rods 221,222 forming the opposite lateral edges 224,225 of the member can have a substantially conical shape. In this way, each of the rods can have a substantially circular cross-section where the diameter Dr varies according to its longitudinal position on the member, gently and gradually tapering from a wider proximal diameter Dp at the proximal end 216 to a narrower distal diameter Dd at the distal end 217. The substantially conical shape can be characterized by a ratio between these two diameters Dd/Dp which ranges from between about 0.05 to 0.5. The conical shape can be an oblique circular cone so that the width of the member remains substantially constant along the entire longitudinal length L2 of the member. Alternately, the conical shape can be a tilted, right circular cone where cross-sections perpendicular to the elongation axis of the member form ellipses, albeit ones with very low eccentricity.

The rods 221,222 are interconnected by a medial webbing strip 223 having generally parallel trapezoidal front and back surfaces where its width tapers according the shape of the rods. Thus, the webbing strip can be substantially planar, having a substantially uniform thickness T7 along the entire longitudinal length L2 of the member.

Figure 22:
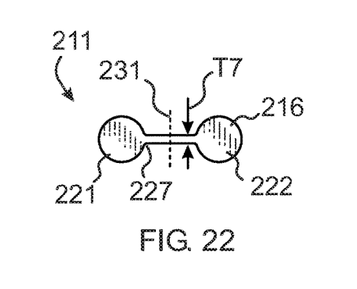
FIG. 22 is a diagrammatic proximal end view thereof.
Figure 23:
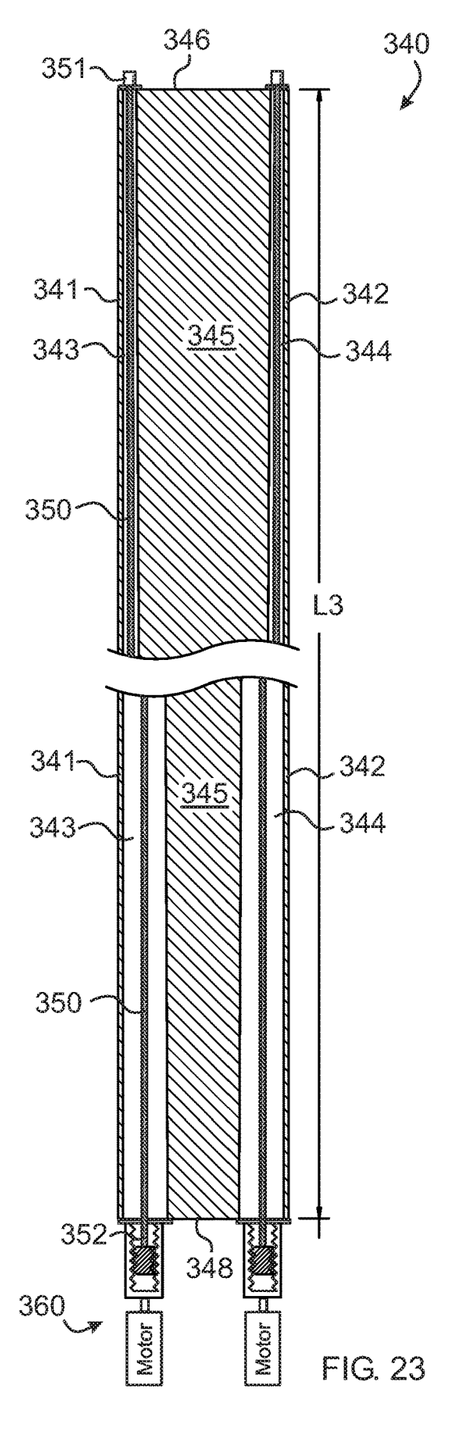
FIG. 23 is a diagrammatic partial elevational front view of a complex geometry variable stiffness structural member according to an alternate exemplary embodiment of the invention having a stiffening cable.
Figure 24:
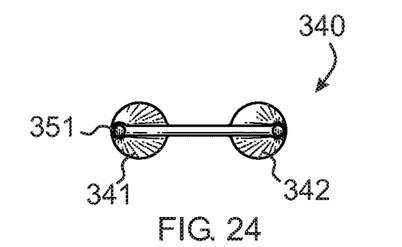
FIG. 24 is a diagrammatic distal end view thereof.
Figure 25:
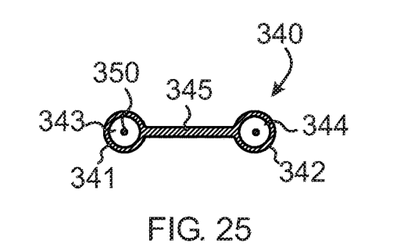
FIG. 25 is a diagrammatic cross-sectional end view taken along a medial section thereof.
Figure 26:
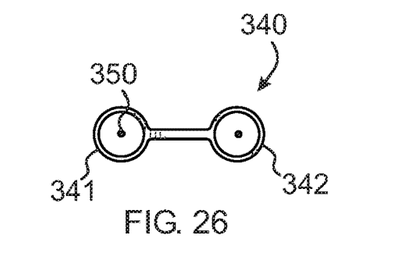
FIG. 26 is a diagrammatic proximal end view thereof.

Referring primarily to FIG. 22, by making both rods 221,222 substantially identically shaped and dimensioned, the member 211 can be made to be symmetric about a plane 231 perpendicularly bisecting the webbing strip 223. In this way, the symmetrical member can provide substantially uniform resistance to various loads. It shall be noted that the transition between each rod and webbing strip can be gradual in the form of a concave fillet 227 having a radius of between approximately 5% to 25% of the cross-sectional diameter of the rod at the point of contact with the fillet. Although the member is shown having a barbell shaped cross-section where the rods form a pair of circles, other shapes are available, such as for example, ellipses, rounded squares, rectangles, ovals, or other polygons having rounded vertices.

Referring now to FIGS. 23-26, there is shown a variable stiffness member 340 which can be used in an adjustable stiffness cantilevered support beam such as those described above. The member can be similar to the member of FIGS. 17-22, however in this embodiment the member can be further adapted so that the rods 341,342 are hollow, each having a central lumen 343,344 extending along the length L3 of the member. Each lumen can terminate in apertures at the distal and proximal ends 346,348 of the member. Alternately, the lumens can terminate in a closed cup at one or both ends. The medial webbing strip 345 interconnecting the rods can remain solid. A stiffening cable 350 can extend through the lumen of a rod. One end 351 of the cable can be fixed to the distal end 346 of the member. The other end 352 of the cable can pass through the proximal end 348 of the member and secure to an adjustment 360 such as a motor driven threaded bearing that adjusts the tension on the cable. In this way the stiffness of the rod, and thus the stiffness of the member can be adjusted by operation of the motor. The lumens can serve to reduce the mass and amount of material contained in the member, and thus weight, while maintaining adequate bending and torsional stiffness and strength.

Figure 27:
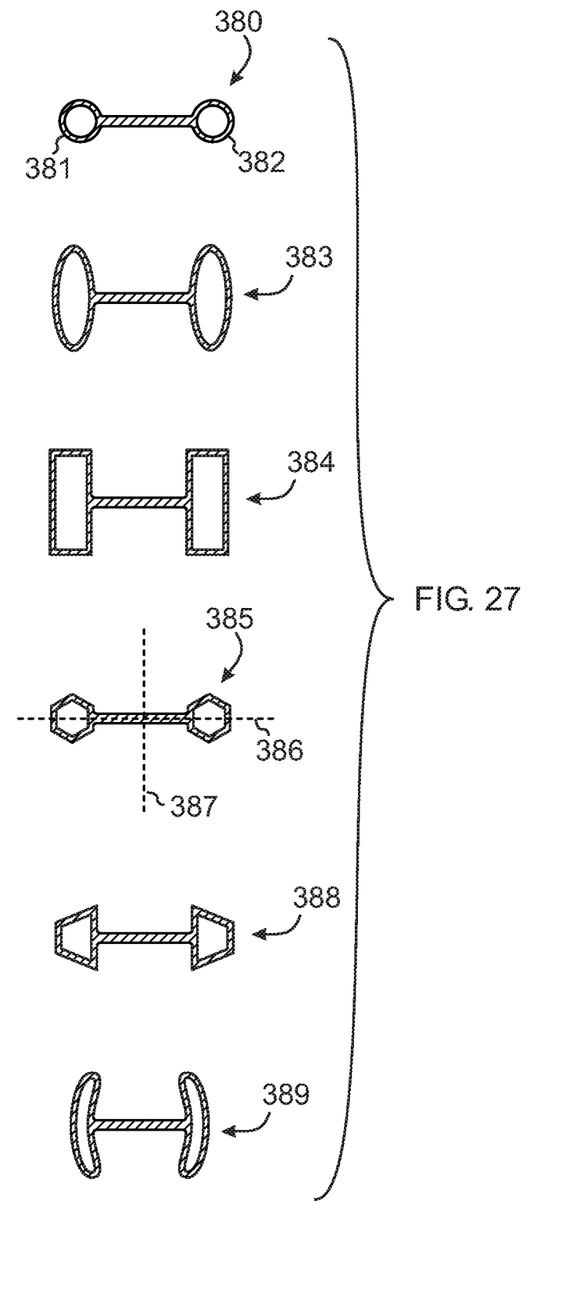
FIG. 27 is a diagrammatic cross-sectional views of various rod geometries.

Referring now to FIG. 27, as previously shown, the cross-sectional shape of the member 380 can include rods 381,382 having a substantially circular shape. However, other shapes may be useful for other structural members depending on the application for which the members are used, and due to manufacturing concerns. For example, the rods can have an elliptical shape 383, or a quadrangular shape, including squares and rectangles 384. Rods having other diametrically symmetrical polygonal shapes such as hexagons 385, octagons, and decagons can be used to provide a member cross section which is symmetric about the side-to-side transverse axis 386, and the front-to-back transverse axis 388. Other shapes can be used which are diametrically symmetric depending on orientation such as trapezoids 388, pentagons, and heptagons. Myriad other more complex shapes which provide symmetricity with respect to both transverse axes are available such as substantially half-moon shapes 389. For cantilevered support beam applications such symmetricity is preferred in order to ease installation and maintain uniform resistance to various off-axis loads. However, non-symmetric rod cross-sections can be used depending on the application.

Figure 28:
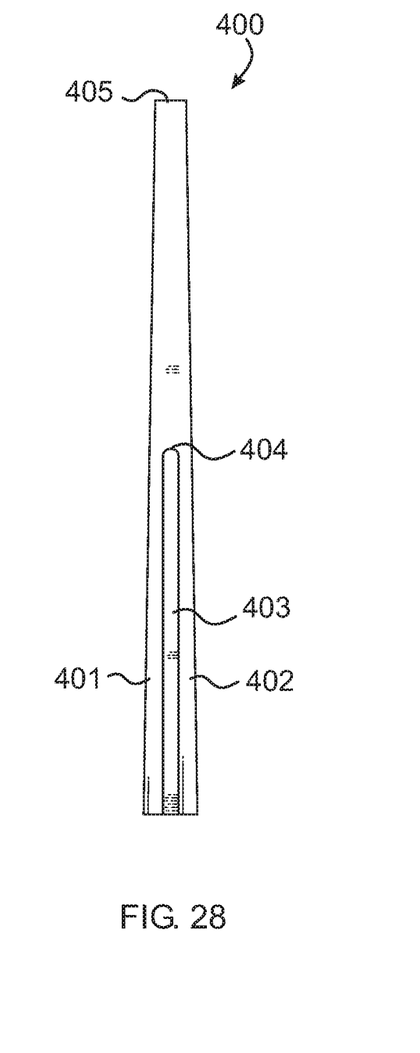
FIG. 28 is a diagrammatic front view of a complex geometry variable stiffness structural member according to an alternate exemplary embodiment of the invention having tapering rods that join at medial section.

Referring now to FIG. 28, there is shown a complex geometry variable stiffness structural member 400 according to an alternate exemplary embodiment of the invention. The member can include a lateral pair of tapering rods 401,402 separated by a lateral web 403. The rods can gradually come together to join at an axially medial location 404 on the member where the webbing disappears. The joined rods can continue to taper from the medial section toward the distal end 405 of the member.

The above-described members and adjustable blocks can provide essentially infinite variability in stiffness to a structural beam. It has been shown that the stiffness of the individual members can vary as a function of distance from the proximal end of the member according to the geometry of the lateral rods, fiber orientation within the various zones of the member, and the thickness of the interconnecting webbing strip.

It has been found that the properties exhibited by the above described structural beams can be useful in vehicular leaf springs due to the rigorous dynamical moments subjected to such structures and the adjustable and variable stiffness of the beam along its length.

While the preferred embodiments of the invention have been described, modifications can be made and other embodiments may be devised without departing from the spirit of the invention and the scope of the appended claims.

What is claimed is:

1. An adjustable stiffness support device comprises:
a first resilient member having a first oblong shape in a longitudinal direction;
said first member having a near end and a far end;
a second resilient member having an second oblong shape in said longitudinal direction;
said second member having a proximal end and a distal end;
wherein said first and second members are spaced apart from each other by a separation distance;
a first block connecting said first member to said second member;
a second block connecting said first member to said second member;
wherein said first and second blocks are longitudinally spaced apart by a spacing;
wherein said second member has a stiffness that is longitudinally variable.

2. The device of claim 1, wherein said second member tapers between said proximal end and said distal end.

3. The device of claim 1, wherein said second member slides between a first longitudinal position and a second longitudinal position spaced a longitudinal length apart from said first longitudinal position.

4. The device of claim 1, wherein said first block comprises a first fastener releasably securing said first block to said second member; and wherein said second block comprises a second fastener releasably securing said second block to said second member.

5. The device of claim 4, wherein at least one of said first and second blocks comprises a third fastener releasably securing said at least one of said first and second blocks to said first member.

6. The device of claim 1, wherein said first block has a first longitudinal position with respect to said members and wherein said second block has a second longitudinal position with respect to said members, and wherein said first and second longitudinal positions are adjustable.

7. The device of claim 1, wherein said first member has a fixed proximal end and a free distal end, whereby a load applied at said second block is cantileveredly supported by said device.

8. The device of claim 1, wherein said separation distance is adjustable.

9. The device of claim 1, wherein said spacing is adjustable.

10. The device of claim 1, wherein said first block is fixed with respect to said members and wherein said a longitudinal position of said second block is adjustable.

11. The device of claim 1, wherein said second member comprises:
a first zone between said proximal end and said distal end;
wherein said first zone comprises a first fiber reinforced material having a first set of plural fiber orientations;
wherein first fiber reinforced material has a first longitudinal stiffness and a first latitudinal stiffness different from said first longitudinal stiffness;
a second zone between said proximal end and said distal end, and adjacent to said first zone;
wherein said second zone comprises a second fiber reinforced material having a second set of plural fiber orientations different from said first set of plural fiber orientations;
wherein said second fiber reinforced material has a second longitudinal stiffness different from said first longitudinal stiffness.

12. The device of claim 1, wherein said second member further comprises:
a pair of substantially parallel, oblong, spaced-apart rods, laterally joined by a webbing strip; and,
wherein each of said pair of rods gradually tapers from said proximal end toward said distal end.

13. The device of claim 12, wherein a first one of said pair of rods comprises an axial lumen.

14. The device of claim 13, which further comprises a cable extending through said axial lumen; said cable being connected to said distal end and said proximal end; and a mechanism for adjusting the tension of said cable.

15. The device of claim 1, wherein said second member has a variable cross-sectional geometry along a longitudinal length of said second member.

16. The device of claim 1, wherein said second member is formed by a unitary piece of composite material.

* * * * *